Feb. 16, 1954     L. J. NOWAK, JR     2,669,412
TWIN BEAM WEIGHER
Filed May 17, 1951     9 Sheets-Sheet 1
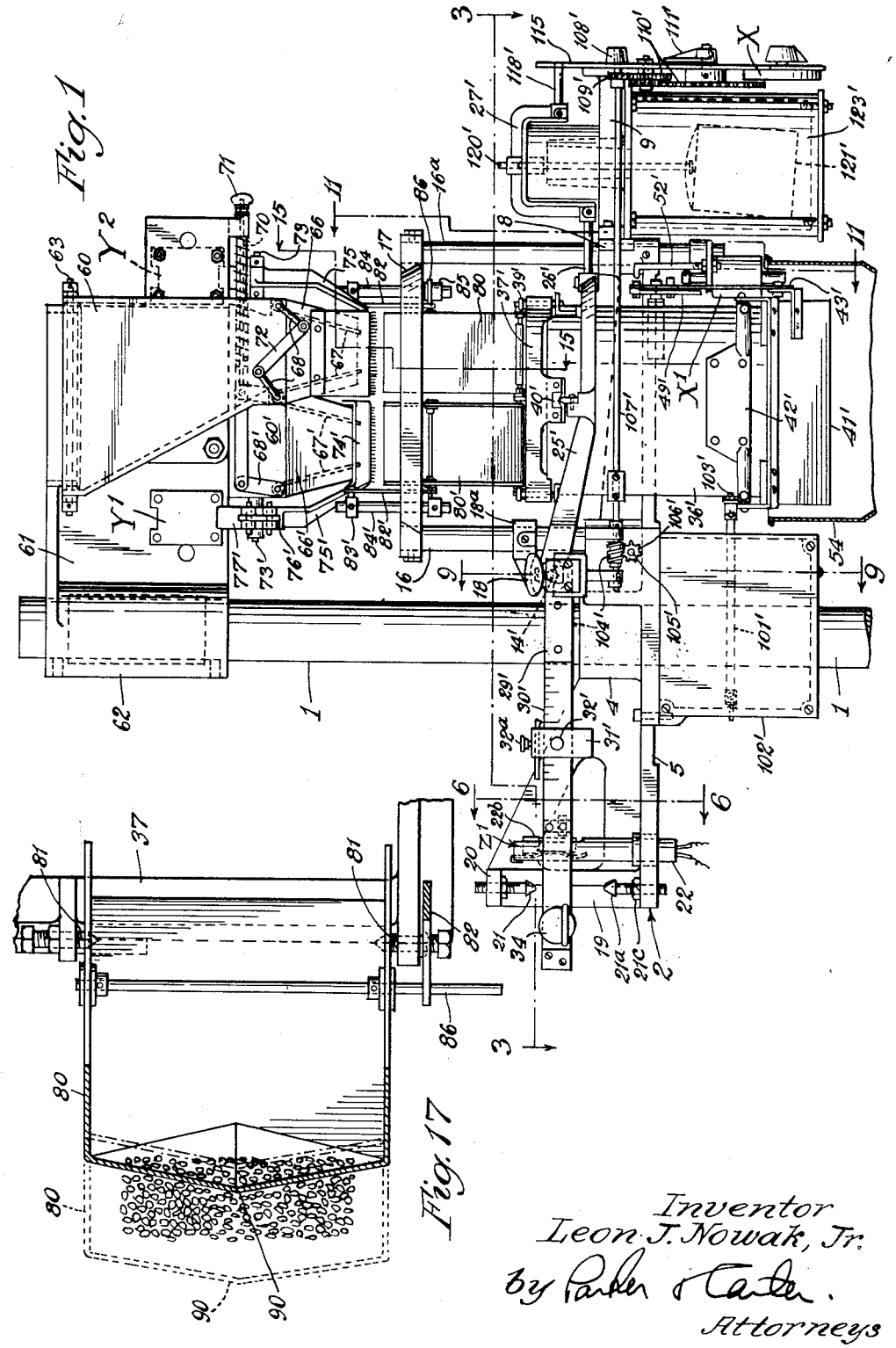
Inventor
Leon J. Nowak, Jr.
by Parker & Carter
Attorneys Feb. 16, 1954   L. J. NOWAK, JR   2,669,412
TWIN BEAM WEIGHER
Filed May 17, 1951   9 Sheets-Sheet 2
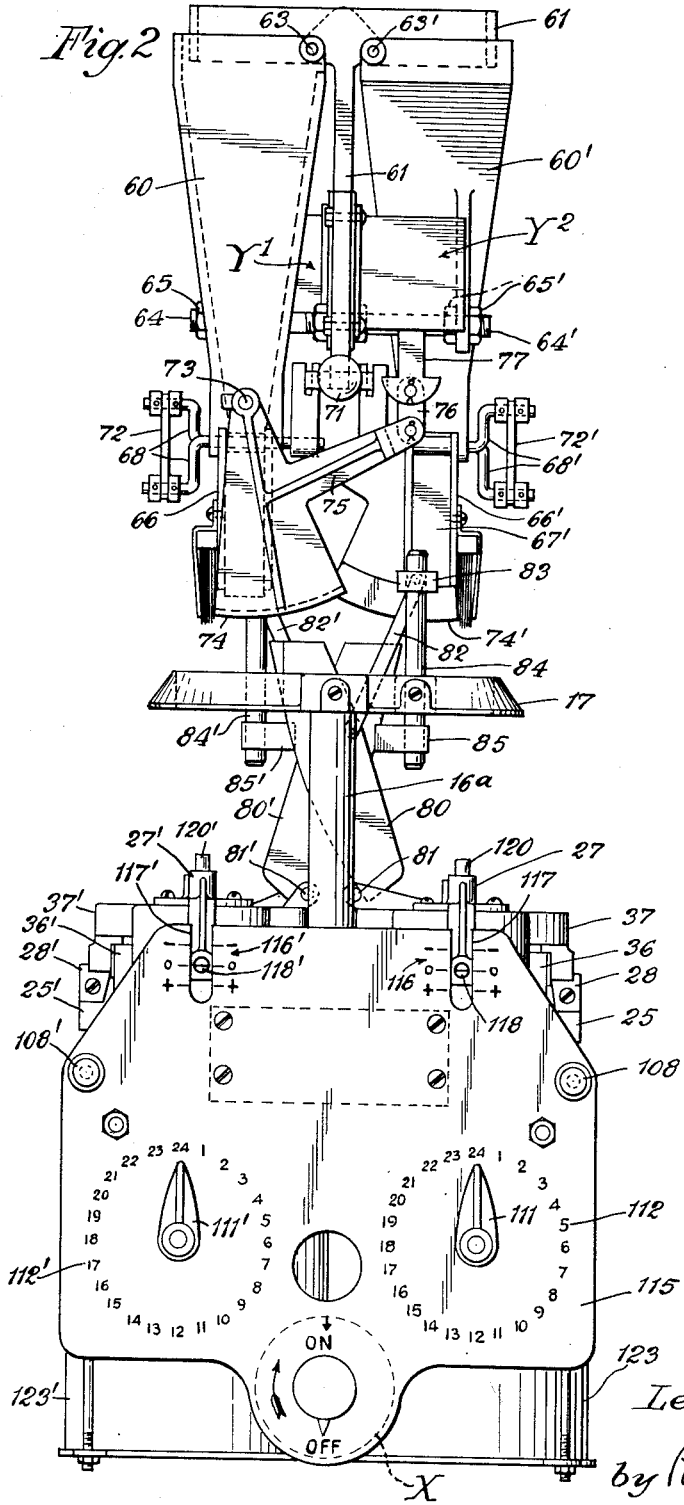
Inventor
Leon J. Nowak, Jr.
by Parker & Carter
Attorneys

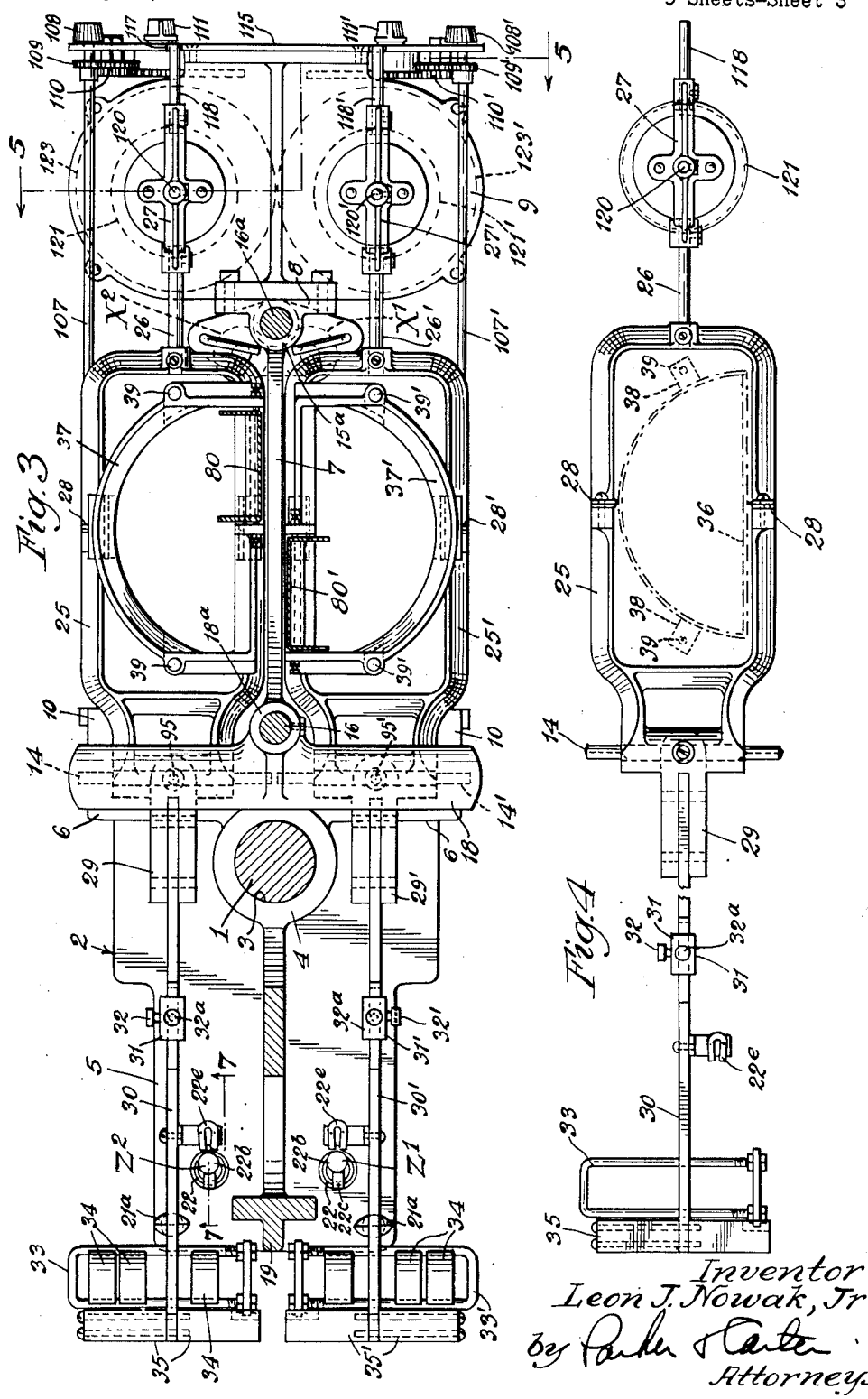

Feb. 16, 1954　　　L. J. NOWAK, JR　　　2,669,412
TWIN BEAM WEIGHER
Filed May 17, 1951　　　9 Sheets-Sheet 4
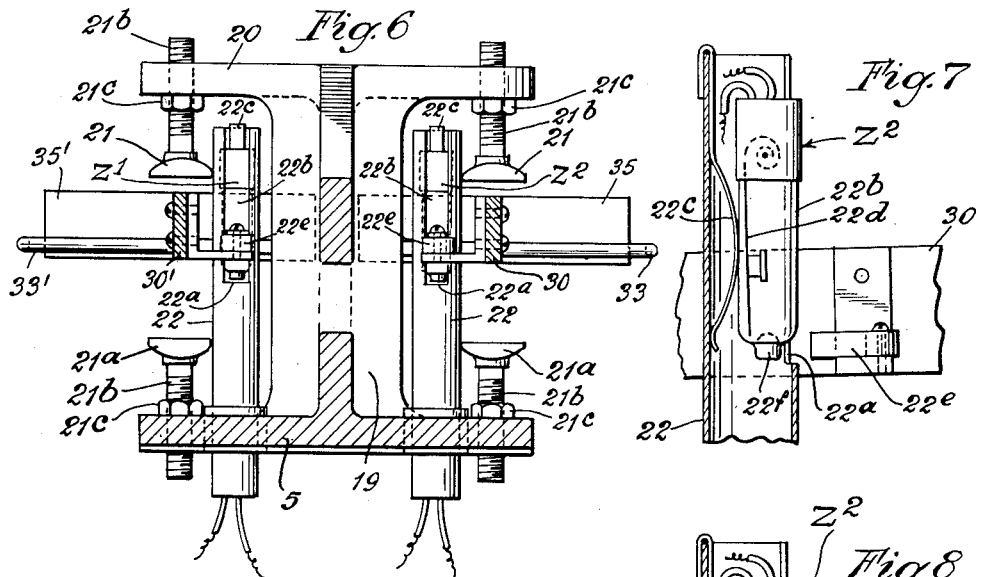
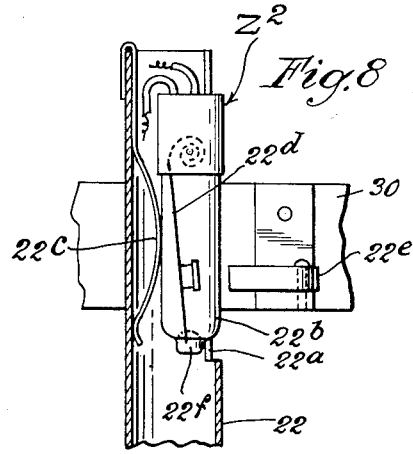
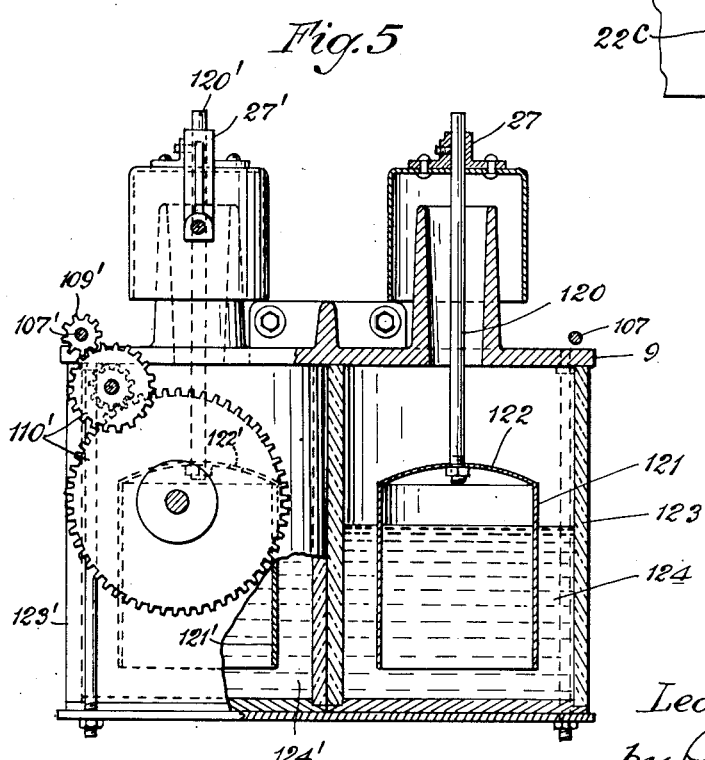
Inventor
Leon J. Nowak, Jr
by Parker & Carter
Attorneys Feb. 16, 1954 L. J. NOWAK, JR 2,669,412
TWIN BEAM WEIGHER
Filed May 17, 1951 9 Sheets-Sheet 5
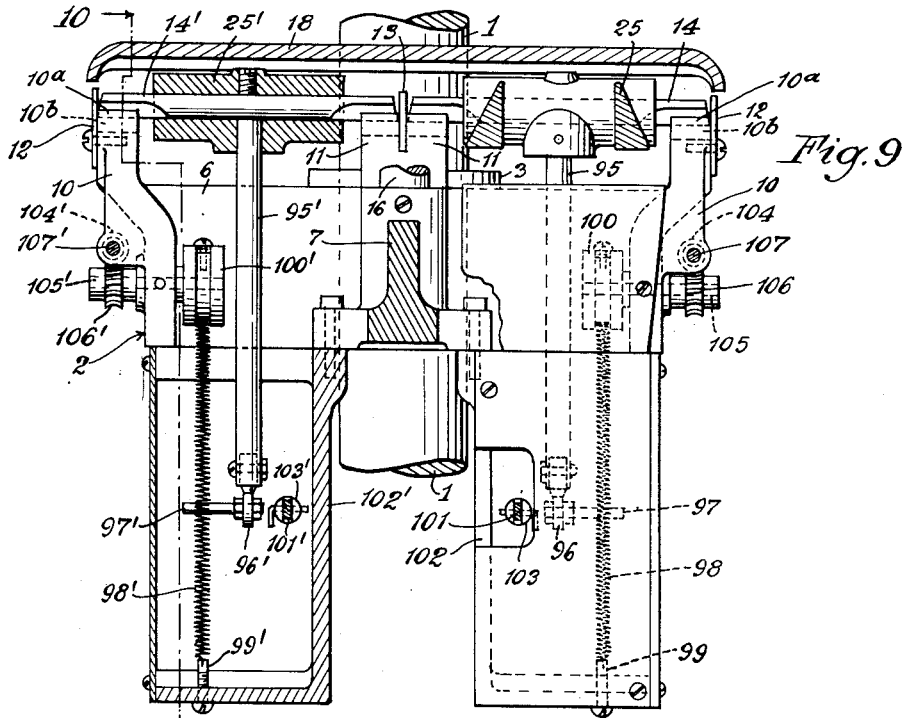
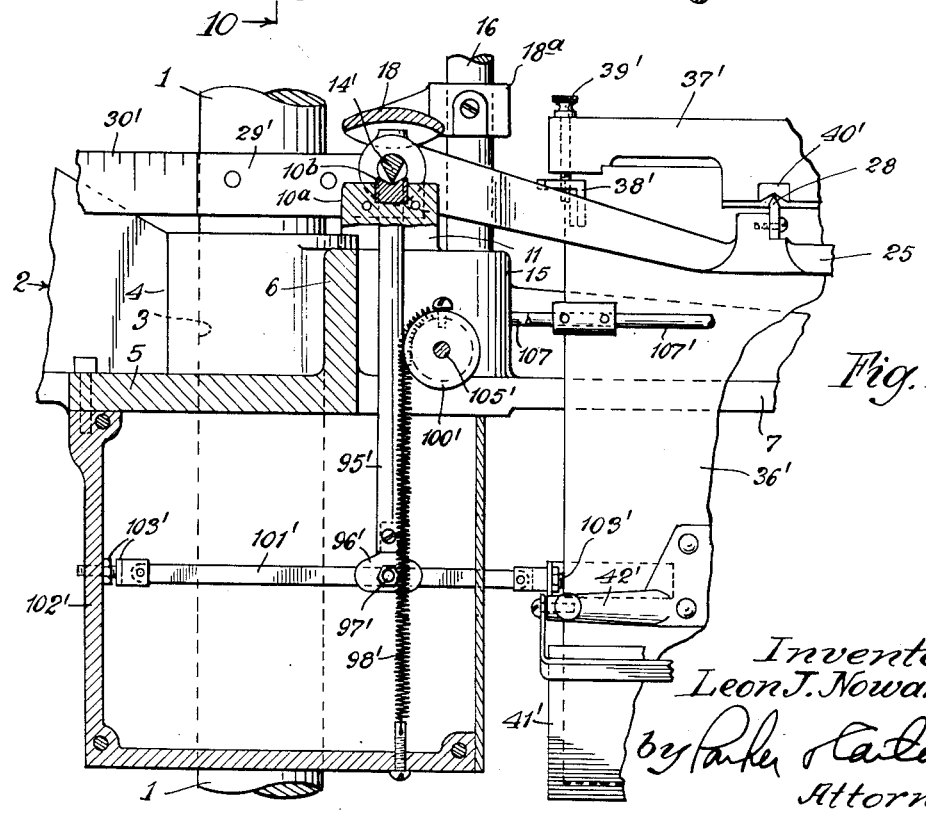
Inventor
Leon J. Nowak, Jr.
by Parker & Carter
Attorneys

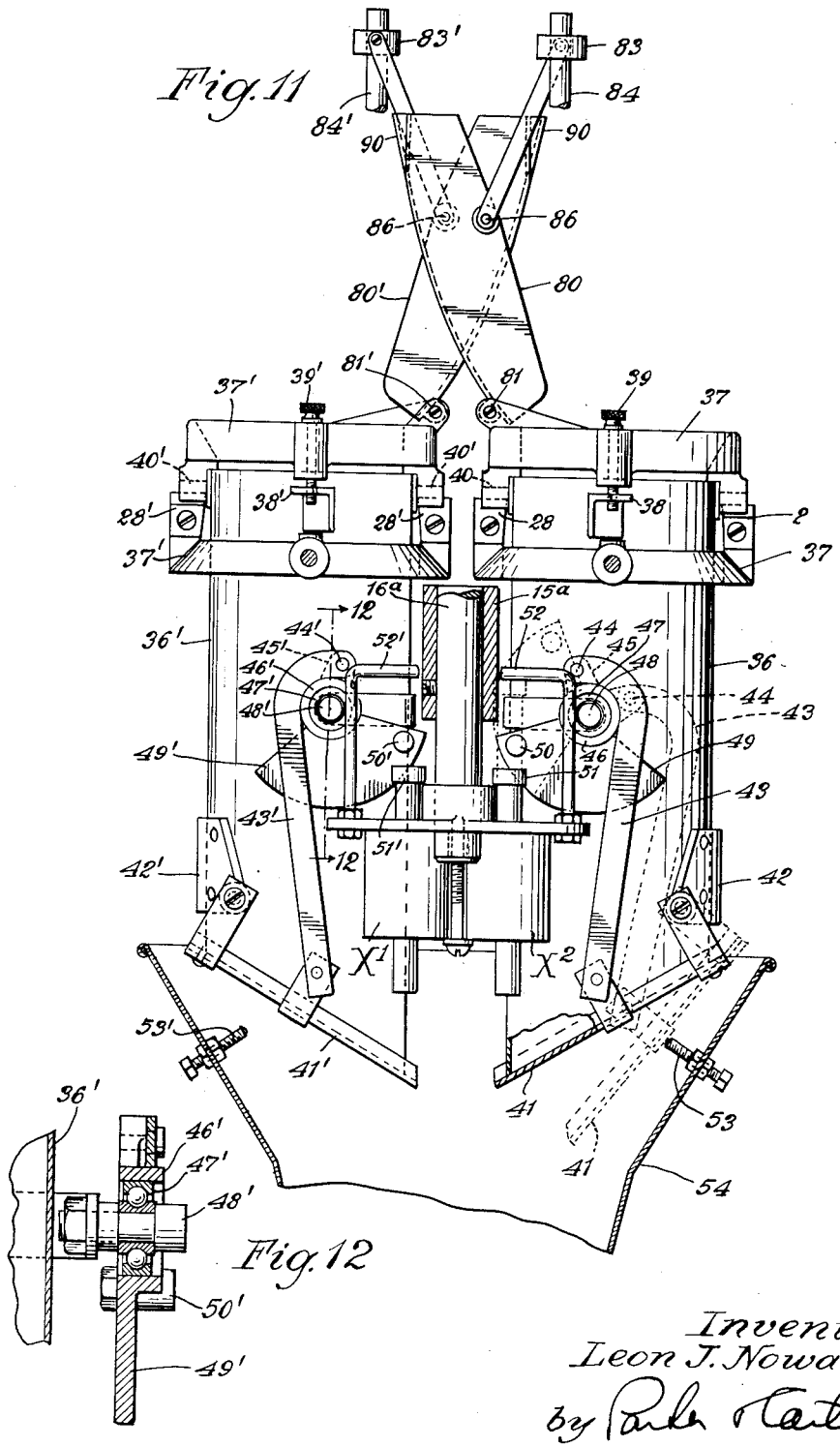

Feb. 16, 1954　　　　　　L. J. NOWAK, JR　　　　　2,669,412
TWIN BEAM WEIGHER
Filed May 17, 1951　　　　　　　　　　　　　　9 Sheets-Sheet 7
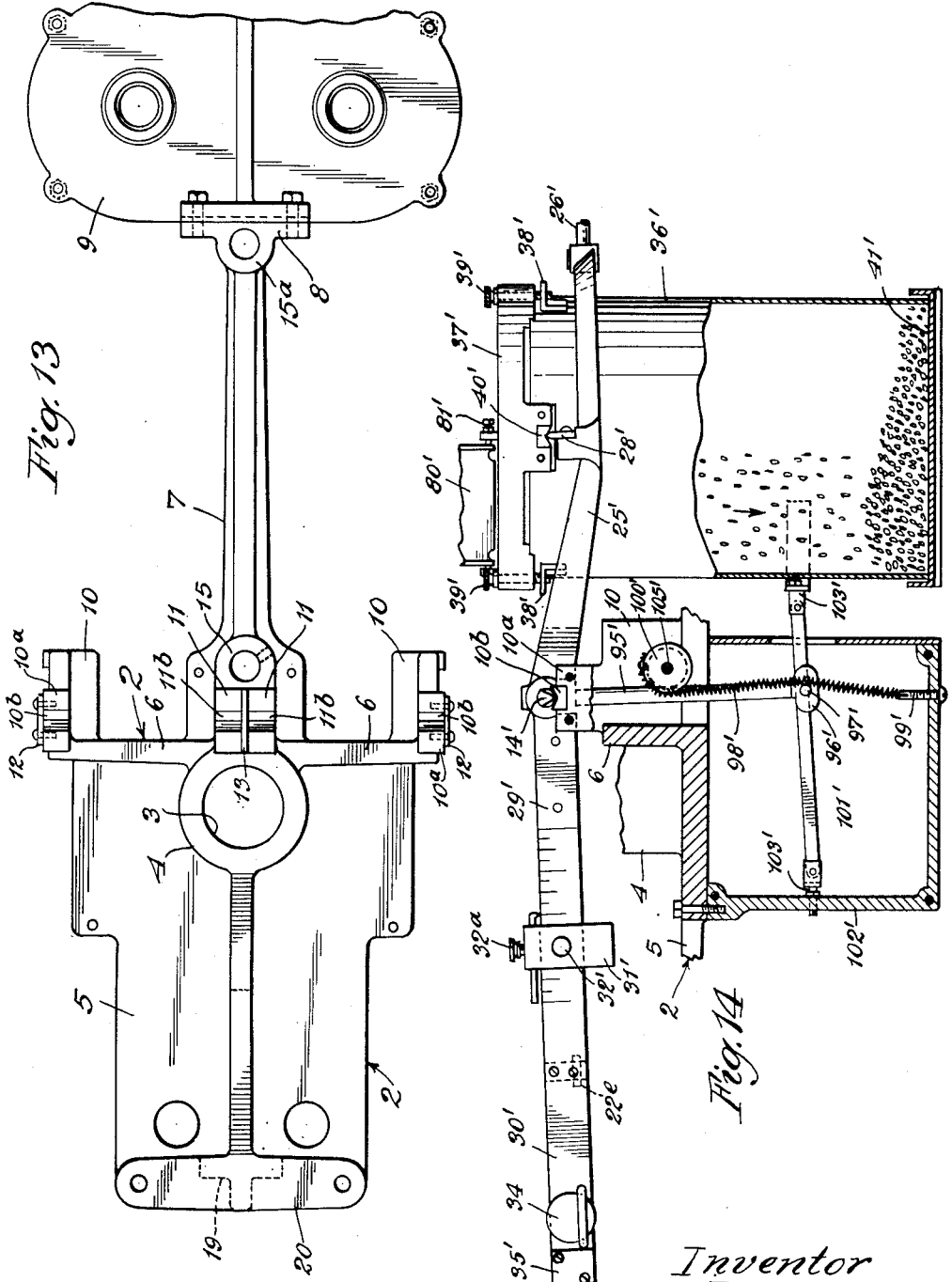
Inventor
Leon J. Nowak, Jr.
by Parker Carter
Attorneys Feb. 16, 1954

L. J. NOWAK, JR 2,669,412

TWIN BEAM WEIGHER

Filed May 17, 1951

Inventor
Leon J. Nowak, Jr.
by Parker Carter
Attorneys

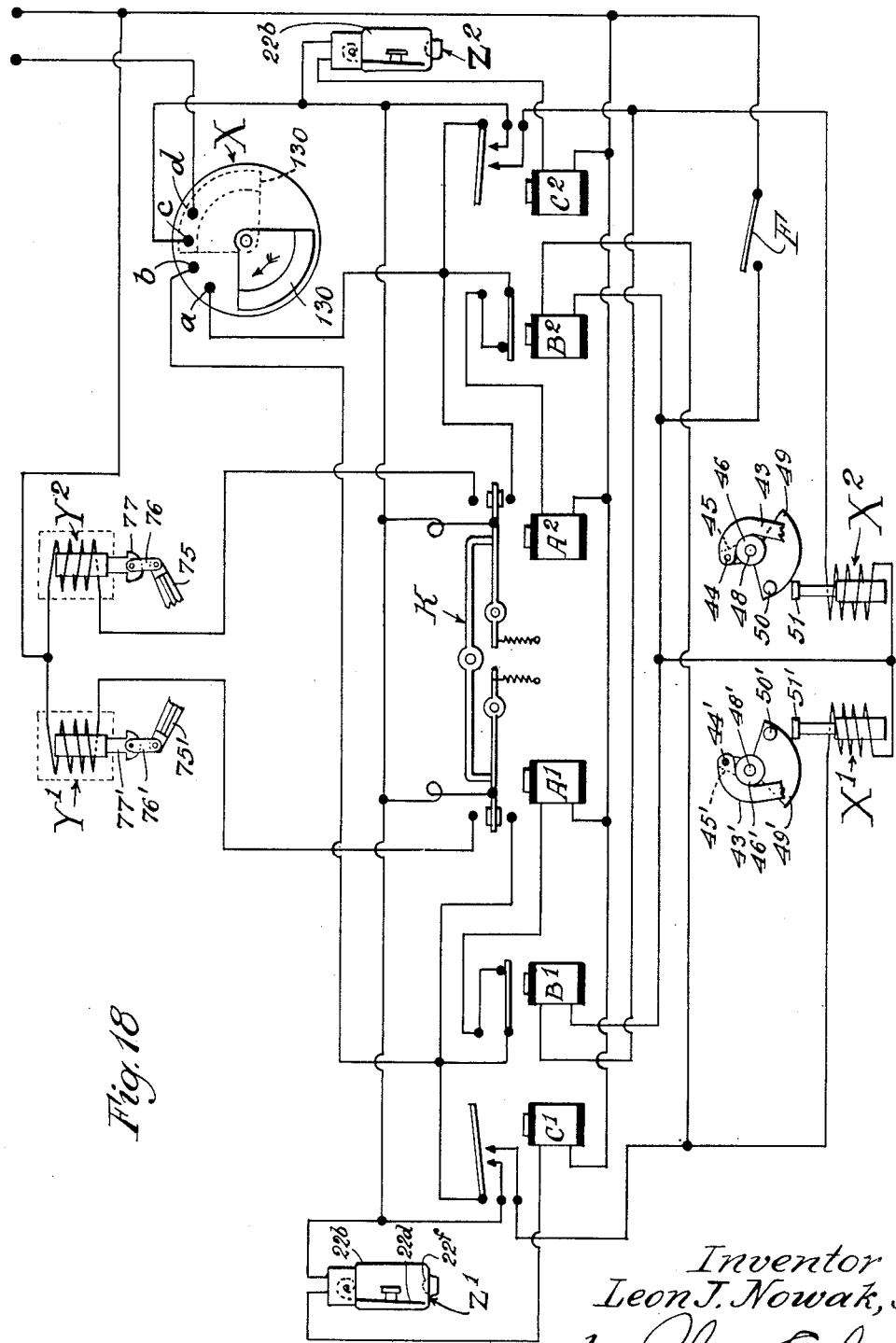

Patented Feb. 16, 1954

2,669,412

UNITED STATES PATENT OFFICE 2,669,412

TWIN BEAM WEIGHER

Leon J. Nowak, Jr., Park Ridge, Ill.

Application May 17, 1951, Serial No. 226,812

19 Claims. (Cl. 249—22)

My invention relates to weighing equipment, and has for one purpose to provide automatic operating weighing equipment.

Another purpose is to provide a composite interlocking system in which two scale units operate in succession.

Another purpose is to provide a multiple unit weighing system in which the material being weighed is fed alternately into two separate receiving containers.

Another purpose is to provide such a system in which means are provided for a highly accurate "dribble" finish of the delivery of the charge to the receiving container.

Another purpose is to provide a container assembly in which, in the course of finishing the charge delivery to one container, the surplus is delivered to another container.

Another purpose is to provide such an automatic weighing unit in which none of the material undergoing weighing is returned to any reservoir or hopper for redelivery.

Other purposes will appear from time to time in the course of the specification and claims.

I illustrate my invention more or less diagrammatically in the accompanying drawings wherein:

Figure 1 is a side elevation;

Figure 2 is a front elevation of the structure of Figure 1, on an enlarged scale;

Figure 3 is a horizontal section, on an enlarged scale, on the line 3—3 of Figure 1;

Figure 4 is a plan view on an enlarged scale of one of the scale beams employed;

Figure 5 is a vertical section on an enlarged scale on the line 5—5 of Figure 3;

Figure 6 is a vertical section, on an enlarged scale, on the line 6—6 of Figure 1;

Figure 7 is a vertical section, on an even more enlarged scale, on the line 7—7 of Figure 3;

Figure 8 is a similar vertical section illustrating the parts in a different position;

Figure 9 is a vertical section, on an enlarged scale, on the line 9—9 of Figure 1.

Figure 10 is a vertical section on an enlarged scale on the line 10—10 of Figure 9;

Figure 11 is a vertical section on the line 11—11 of Figure 1, on an enlarged scale;

Figure 12 is a vertical section, on an even more enlarged scale, on the line 12—12 of Figure 11;

Figure 13 is a plan view on an enlarged scale of the main frame and dash-pot structure;

Figure 14 is a partial vertical section on an enlarged scale along one of the weighing beam units;

Figure 17 is a horizontal section, on an enlarged scale, on the line 17—17 of Figure 16; and Figure 18 is a wiring diagram.

Like parts are indicated by like symbols throughout the specification and drawings.

Figure 15:
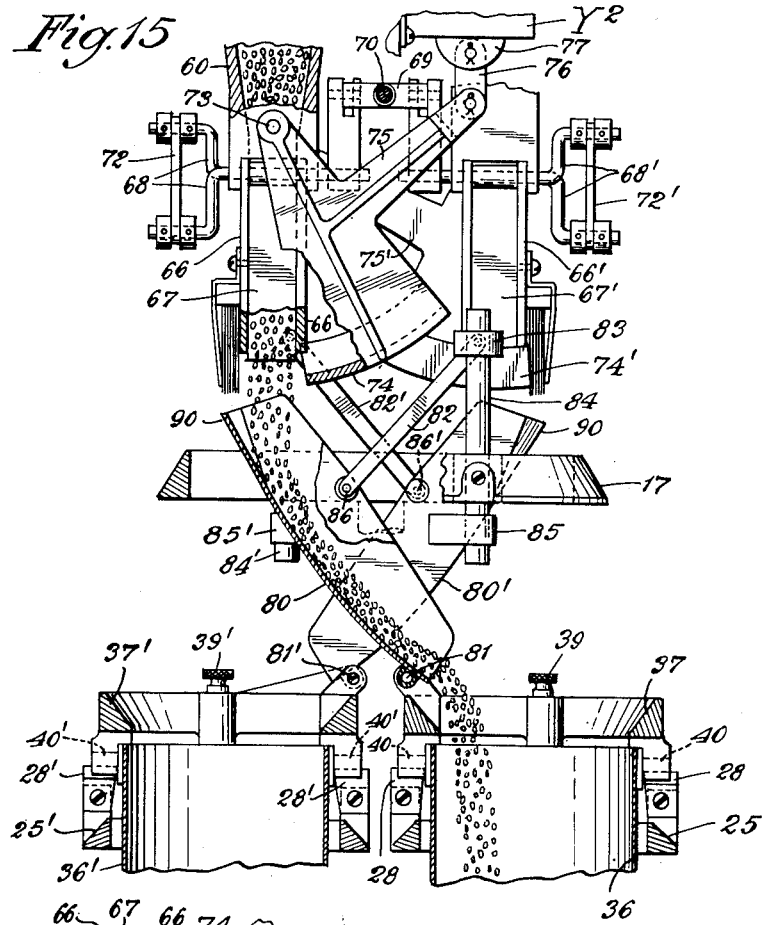
Figure 15 is a vertical section, on an enlarged scale, on the line 15—15 of Figure 1.

Referring to the drawings, 1 generally indicates any suitable support, herein shown as a generally vertical post, mounted on any suitable base, not herein shown. 2 generally indicates a generally horizontally extending main frame structure which may be secured to the support 1 by any suitable means. I illustrate, for example, in Figure 13, an aperture 3 through which the support 1 passes, the aperture being surrounded by a reinforcing sleeve 4, connected to the main webs 5 of the main frame. Extending laterally from intermediate vertical webs 6, I illustrate a horizontal extension, generally indicated as 7, terminating in an outer enlargement 8. Secured to the enlargement 8 is a top plate 9, the purpose of which will later appear. It will also be noted, for example, in Figures 9 and 13, that side members 10 project laterally from the webs 6 in general parallelism with the central member 7. These side members, as shown at 10a in Figure 14, include upward projections adapted to receive scale blocks or scale bearings 10b. 11, 11 indicate central upward projections, generally aligned with the side members 10 and carrying upwardly concave scale bearing blocks 11b. As will be seen in Figure 9, there are outside limit plates 12, and an inside limit plate 13, which limit the endwise movement of the below-described weighing beam pivot bars 14 and 14'.

The above-described main frame also includes spaced, apertured bosses 15 and 15a through which pass upwardly extending supporting rods 16 and 16a which support, at their upper ends, a generally rectangular sub-frame 17. 18 is a cover plate for the scale pivot structure which may be secured to the member 16, for example, by a collar 18a, as can be seen, for example, in Figure 1. Integral with the left end of the main frame 2, referring to the position of the parts as shown in Figure 13, is an upwardly projecting integral member or support 19 having an upper cross-bar 20, the opposite ends of which adjustably carry top scale beam stops 21. The bottom stops 21a are carried by an adjacent end portion of the main frame 2. This structure is shown in elevation at the left of Figure 1.

Each of these is shown as having a threaded stem 21b and a lock nut 21c. As will be clear from Figure 6, the upper stops are adjustably screw-threaded in relation to the cross-bar 20, whereas the lower stops are adjustably screw-threaded in the underlying end of the webs 5. (Magnetic) mercury switches $Z^1$ and $Z^2$ are also supported in the webs 5, as shown in Figure 6. Each switch $Z^1$ or $Z^2$ includes an outer tube 22 slotted, as at 22a, to receive the (magnetic) mercury glass-walled switch element 22b, held in position by the leaf spring 22c. Within the element 22b is a movable spring contact 22d which may be moved by the exterior magnet 22e from the circuit-breaking position of Figure 7 to the circuit-closing position of Figure 8. In the latter event, the lower end or edge of the spring switch element 22d contacts the mercury pool 22f. Any suitable connection, not shown, extends from the mercury pool or body 22f to a lead in the later-described circuit. It will be understood that there is a permanent magnet 22e carried on each of the scale beams, and that when the appropriate scale beam rises to a predetermined position the associated switch is closed. The relation of this structure to the operation of the device will be discussed later.

It will be understood that on the base structure of Figure 13, two separate scale or weighing means are employed, arranged side by side, as shown in Figure 3. One of the individual beams is illustrated in Figure 4, and may be described as follows, corresponding parts of the two beams being indicated in Figure 3, with the prime symbol added to the reference numerals of one of the scale beams, the scale beams being identical, except as otherwise herein pointed out.

Considering the typical beam structure of Figure 4, each such beam is supported upon one of the bars 14 or 14'. Extending in one direction from the bar is a loop 25 to which is secured the bar extension 26, at the outer end of which is the upwardly bent portion 27. The opposite sides of the loop 25 carry upwardly convex pivot bearings or knives 28. Extending in the opposite direction from the pivot bar 14 is the fork 29, within which is secured the extension 30 which slidably carries an adjusting weight 31, which may be set by the operator before initiating operation of the device. When set, it may be locked in position, for example, by the set screw 32. A pointer associated with the weight 31 may be adjusted and locked by a set screw 32a. Secured to the outer end of the extension 30 is a U-shaped element 33 adapted to receive any suitable removable weights 34 for the adjustment of the device. 35 generally indicates any suitable terminal weight structure or counterbalance. In adjusting the device, members 34 may be added or removed, and a finer, delicate adjustment may be made by moving the weight 31 and setting it in the desired position along the calibration indicated at Figure 1 on the extension 30.

Within the loops 25 and 25' are suspended the buckets 36 and 36'. These buckets are shown as generally semi-cylindrical, having adjacent, parallel, plane sides, as will be clear from Figures 3 and 4. Each bucket is associated with a top bucket support 37 or 37', to which the bucket is secured by ears 38, 38' and screws 39, 39'. Each top support 37 or 37' carries downwardly concave bearings 40 or 40', opposed to the bearing blades 28 or 28' of the loops 25, 25'. Each bucket carries at its lower end a bottom gate 41 or 41', pivoted to a fitting 42 or 42'. A retaining and releasing arm 43 or 43' extends upwardly from each gate. Each arm is curved at its upper end, as shown in Figure 11, and is pivoted, as at 44 or 44', to an ear 45 or 45' on a sleeve 46 or 46', which surrounds an anti-frictional bearing assembly 47 or 47' about a stub pin 48 or 48' extending outwardly from the wall of one of the buckets. Each sleeve 46 or 46' carries a segmental weight 49 or 49' which normally tends to hold the bucket closed, with the pivot 44 or 44' over-center in relation to the axis of the pin 48 or 48'. Each segmental weight 49 or 49' carries a pin 50 or 50' adapted to be engaged by the solenoid plunger 51 or 51' of the solenoid $X^1$ or $X^2$. It will be understood that when the solenoid $X^1$ or $X^2$ is energized it moves its plunger 51 or 51' upwardly as far as the stop 52 or 52' will permit. The result is to rotate the sleeve 46 or 46' against gravity and to open one of the bottom gates. One of the gates is shown in open position in dotted line in Figure 11. The outward opening may be limited by any suitable stop 53 or 53' on any suitable chute 54.

It will be understood that in the operation of my system of weighing two paths are provided for the alternative or successive delivery of a stream of the material to be weighed. As an example, I illustrate, as shown in Figure 2, two chutes or spouts 60, 60', which may be supplied from any suitable hopper or hoppers, not herein shown. The spouts may be supported on the top supporting member 61, which includes a sleeve 62 surrounding an upper portion of the vertically extending support or post 1. To the laterally extending part of the member 61 the two chutes or spouts 60 and 60' are pivoted, as at 63, 63', and may be held in proper alignment or adjustment by an adjusting stud 64 or 64' and associated nuts 65 or 65'. It will be understood that one of the spouts is vertically aligned above each of the buckets. As shown in Figures 1 and 15, each of the spouts, at its lower end, has parallel walls 66 or 66' between which move movable adjustable walls 67 or 67', whereby the bottom or delivery opening of the spout may be adjusted. The walls 67 or 67' are connected to links 68 or 68', pivoted to a horizontally moving, adjusting rod or U-shaped member 69. It may be adjusted, for example, by the screw-threaded rod 70 with the external knob 71. Any suitable linkage 72 and 72' is provided, whereby, when one pair of walls are adjusted in one spout, the corresponding pair of walls in the opposite spout is, at the same time, adjusted. In other words, by rotation of the knob 71 the pivoted walls 67 or 67' of the two spouts may be simultaneously moved toward or away from each other to vary the delivery opening of both spouts.

Each spout has pivoted to it, as at 73 or 73', a cut-off structure having an arcuate member or gate 74 or 74' and an actuating lever 75 or 75'. Each such lever is connected through a link 76 or 76' to a plunger 77 or 77' of one of the solenoids $Y^1$ and $Y^2$. It will be understood that when these solenoids are energized the spout controlling gates 74 or 74' are moved to the open position, whereas, when the solenoids are not energized, they are returned to the closed position. One of these gates is shown in open position, for example, in Figure 15, whereas both are shown in closed position, in Figure 2. It will be understood that they are not open at the same time, the latter described circuit being effective for that purpose. It will be noted that the solenoids $Y^1$ and $Y^2$ are supported on the top supporting member 61, as shown, for example, in Figure 1.

Figure 16:
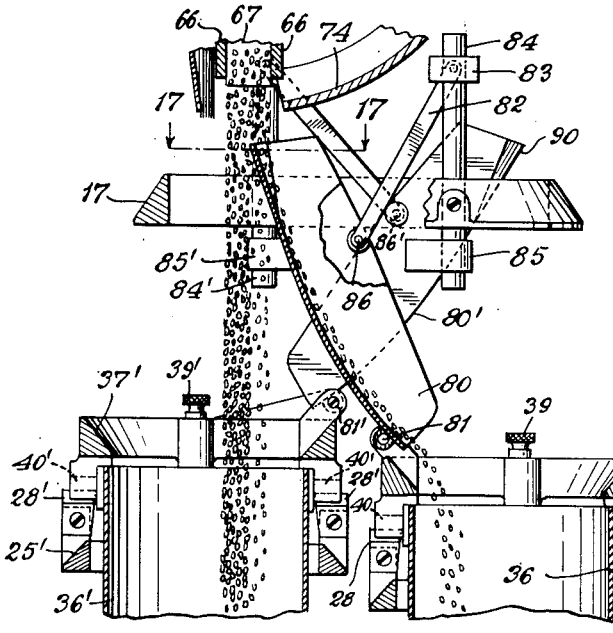
Figure 16 is a similar view, with the parts in a different position.

In the operation of my device it will be understood that each bucket or receiving container is largely filled from the stream of material delivered over the opposite bucket. In order to obtain this result, I associate with each bucket or receiving container a deflector 80 or 80'. Each deflector may be pivoted to a bucket top frame 37 or 37', as at 81 or 81'. Each deflector also carries a link 82 or 82' which is pivoted at its outer end to a collar 83 or 83' which is fixed on a rod 84 or 84', fixed to the sub-frame 17. Each such rod carries, also, a stop 85 or 85', which may be engaged by a pivot pin 86 or 86', which extends laterally from the pivotal connection between the deflector 80 or 80' and its associated link 82 or 82'. It will be understood that the parts are so proportioned that, in the initial position, as shown in Figure 15, the deflector of each bucket extends across and intercepts the stream of material delivered by the spout which overlies the opposite bucket. As the bucket or receiving container receives material, it descends, since the scale beam rotates about its pivot in response to the additional weight in the bucket or receiving container. But as the bucket descends, since the pivot on the collar 83 or 83' is fixed and the pivot 81 or 81' is moving, the deflector is withdrawn from the position in which it is shown in Figure 15 toward the position in which it is shown in Figure 16, and is eventually completely withdrawn from the stream. As it is withdrawn from the stream, and during the continuance of delivery of the stream, the surplus material drops into the bucket with which the stream is aligned. However, as will shortly appear, this delivery of material directly into the bucket shortly terminates when the spout controlling gate or shutter 74 or 74' is moved by the solenoid $Y^1$ or $Y^2$ to the closing position. In other words, it will be clear that when one of the streams begins to flow, it delivers into the deflector of the bucket or container aligned with the opposite stream. That bucket or container already has some material in the bottom, but the charge to be weighed is completed by delivery of material along the deflector of the bucket undergoing weighing. It will be understood, however, that to obtain a precisely measured charge it is important that the final increments of material be very small. As will be clear from Figure 17, the upper portion of the deflector may be generally triangular, or may have a central angle, or projection or beak, as indicated at 90 in Figure 17. When the deflector goes through its final stage of withdrawal from the stream the cross-sectional area of the stream which is intercepted by the deflector is progressively reduced until it is at the vanishing point, when only a very small central point of the central angle 90 intercepts the stream. I provide, in effect, a very accurate "dribble" finish to the material delivering operation.

Just before or at the time of the final withdrawal of the deflector from the stream over the opposite bucket, the scale beam magnet closes the switch $Z^1$ or $Z^2$, and through suitable electrical relays deenergizes the solenoids $Y^1$ or $Y^2$ to permit the gate 74 or 74' to move into the closed position.

Thus, as the charge for one bucket is completed, the flow aligned with the opposite bucket is cut off, after some delivery to the opposite bucket.

The next step in the sequence is the energization of the appropriate solenoid $X^1$ or $X^2$ to trip one of the buckets, or, rather, to trip the bottom gate 41 or 41' of one of the buckets. Until a bucket has been filled and emptied the stream aligned with that bucket cannot resume its flow. But, after the bucket has been emptied, the stream of material vertically aligned with it is again permitted to flow, due to the energization of the appropriate solenoid $Y^1$ or $Y^2$. However, when the stream begins to flow toward the just emptied bucket, it is caught by the deflector of the opposite bucket, and the opposite bucket is filled precisely as above described. Thus, there is a sequence of a delivery of material toward one bucket and then toward the other, the bucket which is out of line with the delivery of material being filled, through its deflector, from the stream of material moving toward the opposite bucket.

The precise wiring diagram or sequence of electrical steps and operations, as indicated in Figure 18, will later be described.

I find it advantageous to provide means for assisting in the lifting of the end of the weighing arm or scale beam opposite to the bucket or receiving container as the bucket or receiving container undergoes filling. With reference, for example, to Figure 14, each of the scale beams may have a downwardly extending rod 95 or 95'. Each such rod carries, at its lower end, a fitting 96 or 96', carrying a laterally extending pin 97 or 97' engageable with a spring 98 or 98' which is anchored, at its lower end, as at 99 or 99', and is secured, at its upper end, to a sheave 100 or 100', which may be adjustably set. Thus, the spring 98 or 98' tends to move the pin 97 or 97' to the left, referring to the position of the parts as shown in Figure 14, and thus assists in elevating the left end of the scale beam. When the scale beam is in horizontal or full-weight position, as shown, for example, in Figure 10, the pin 97' clears the spring 98', so that there is no interference with or inaccuracy of the weighing action.

As will be seen, for example, in Figures 10 and 14, I may employ any suitable means for maintaining the buckets or receiving containers in uniform vertical position. Otherwise, they might be tilted by the weight of the material delivered to the interior, since the chute or delivery streams, as shown in Figure 14, are off-center in relation to the buckets or containers. I may employ, for example, any suitable linkage, generally indicated as 101 or 101', extending from each of the buckets to any suitable housing 102 or 102' which surrounds the above-described spring structure and connection. It will be understood that any suitable adjustments may be provided, as at 103 or 103'.

The above-mentioned sheave 100 or 100' may be delicately adjusted as follows: Each such sheave 100 or 100' carries or is mounted on a shaft 105 or 105', carrying a worm gear 106 or 106' in mesh with a worm 104 or 104' and a shaft 107 or 107', which may be manipulated by an external handle 108 or 108'. These handles are illustrated, for example, in Figures 1 and 2. Rotation of the handle 108 or 108' also rotates a gear 109 or 109' in mesh with a train of gears generally indicated as 110 or 110', the final element of which carries an externally visible pointer 111 or 111'. These pointers are each associated with a visible scale 112 or 112', it being understood that the operator, by rotation of the external knob 108 or 108', can move pointers 111 or 111' accurately in relation to their associated scales, thus determining precisely the desired thrust of the spring 98 or 98'. I find it advantageous, as shown in Figure 2, to provide an indicator panel 115 which may be connected to or supported on the cover plate 9. This panel carries the calibrations 112 and 112', and also carries additional indicating areas 116, 116', located along slots 117, 117', through which extend the end pins or end portions 118, 118' of the scale beams, which are connected to the portions 27 or 27', as shown, for example, in Figure 1. It will be understood that each scale beam has associated with it a hydraulic damper. As shown, for example, in Figure 5, each yoke portion 27 or 27' carries adjustably a pin 120 or 120', which carries at its lower end an open-bottomed bell 121 or 121', having in its upper wall a hole 122 or 122'. Thus, while the scale beam may move up or down, a dash-pot effect is obtained. Any suitable tank 123 or 123' receives a body of liquid 124 or 124' in which the bell or open-bottomed float member is partially and variably submerged. Air may flow through the hole 122 or 122' in either direction, so that a dash-pot or relatively slow-motion effect is obtained.

I have described broadly an interlocking weighing system in which first one and then another of two weighing units operate.

While I do not wish to be limited to any particular method or means of maintaining the interrelationship or interlock, I illustrate in the wiring diagram of Figure 18 a practical arrangement. A master switch X includes a rotatable contact 130 and four fixed contacts $a$, $b$, $c$ and $d$. The system is completely out of operation unless and until these contacts are wiped. The dotted-line position of Figure 18 illustrates the position of the contact 130 during the normal operation of the system. In moving the contact 130 from the full-line to the dotted-line position it makes, and thereafter breaks, circuit through the contacts $a$ and $b$, energizing the coils of the relays $A^1$ and $A^2$. After the contact 130 has reached the dotted-line position, the said coils still remain energized through the holding circuit later described.

To initially start the weighing cycle, magnetic mercury switch $Z^1$ and switch F are momentarily manually closed, which deenergizes relay $A^2$, by means of relay $C^1$, which energizes relay $B^2$, opening its contacts, which are normally closed, and thereby deenergizing coil $A^2$, which, through its contacts, energizes solenoid $Y^2$, providing a stream to bucket 36. Upon that bucket receiving sufficient weight, contact is made through magnetic mercury switch $Z^2$. This, in turn, energizes relay $C^2$, and that, in turn, energizes relay $A^2$, deenergizing solenoid $Y^2$. Discharge does not take place until contact is made with manually-controlled switch F. As contact is made at this point, relay $B^1$ is energized, and also solenoid $X^2$ is energized, thereupon releasing material from bucket 36, and, by action of relay $B^1$, deenergizing relay $A^1$, thereupon energizing solenoid $Y^1$. This sequence continues as long as material is delivered through the streams, and provided the switch F can be manually actuated. Or I may provide any suitable means whereby the switch F is closed at the appropriate time to complete one sequence and start the next. Until the switch F has been closed and the contents of the load container have been released, the opposite stream will not begin to flow, and the next container cannot be filled. However, neither container can be discharged until its respective magnetic mercury switch $Z^1$ and $Z^2$ is closed, and these switches cannot be closed until the respective weighing or scale beam is in balanced position in response to the delivery to its associated receiving container of the desired charge.

It should be kept in mind that momentum might carry the scale beam across the balanced position, even though a full charge had not been received. However, supply will be shut off to that bucket, even though the scale beam is not in balance, because the magnetic mercury switch $Z^1$ or $Z^2$, on making contact, closes the holding circuit to relays $A^1$ or $A^2$. However, the solenoids $X^1$ and $X^2$ cannot be energized, as the switches $Z^1$ and $Z^2$ are open, due to a light weight. Thus, then, it is necessary to manually position the scale beam to balance, in order to close the switches $Z^1$ or $Z^2$, thereby completing the circuits to solenoid $X^1$ or $X^2$. In other words, it is impossible for the machine automatically to deliver a false weight if operated at its correct speed.

It might be mentioned that a mechanical interlock is provided, as at K, to ensure that the circuits of the solenoids $Y^1$ and $Y^2$ cannot simultaneously be closed. Thus, it is impossible to deliver two streams of material simultaneously toward the receiving containers 36 and 36'.

It will be realized that whereas I have described and shown a practical and operative device, nevertheless many changes may be made in size, shape, number and disposition of parts without departing from the spirit of my invention. I therefore wish my description and drawings to be taken as, in a broad sense, illustrative or diagrammatic rather than as limiting me to my specific disclosure herein.

The use and operation of the invention are as follows:

My invention includes two interlocked or interrelated scale beam units, each of which has its own material-receiving receptacle. The receptacles are preferably placed closely adjacent. I provide means for directing a stream of material downwardly toward each receiving container, with means for permitting only one stream to flow at a time. I find it advantageous to arrange one of the streams above each of the receiving containers, but to mount on or associate with each receiving container a deflector which initially extends into the path of the opposite stream. In other words, with two streams aligned above two receiving containers, the receiving container which is about to receive a charge abstracts its material from the stream over the opposite container. This deflector is responsive to the progressive downward movement of the container as it receives material. Thus the deflector is progressively withdrawn from the stream from which it has been taking material, and the weighing operation ends with a dribble feed effective to obtain a very precise accuracy of charge in the receiving container. I find it advantageous to so shape the deflector, for example, by providing it with a point or projection, that the final withdrawal of the deflector from the stream from which it has been taking material ends with, as it were, a final reduction of the area of the deflector opposed to the stream which permits a very precise final measurement. As the deflector withdraws from the stream, the stream delivers material into the opposite receiving container. But since the container undergoing filling is completely filled, the stream from which it is filled, after delivering some small charge into the opposite container, ceases to flow, and the opposite stream begins to flow, the process being carried on with the opposite receiving container.

I find it advantageous to employ the release of the weighed material from one receiving container to initiate the flow of the opposite stream. Thus the sequence is as follows:

A stream of material is delivered, for example, toward container 36, but is intercepted by the deflector of container 36'. Container 36' is filled, and, when filled, the stream is cut off. The opposite stream may begin to flow when the now-filled container 36 has discharged.

In other words, in a broad sense, I provide two interlocked scale beam units, each including a scale beam, a receiving container, and a means for delivering a stream of material toward the container. But the stream of one unit provides the material to be weighed by the other unit, and vice-versa.

An important feature of my invention is my use of a deflector to abstract material from a stream which is not itself directed toward the container. An advantage of this is that by merely moving the deflector out of the line of the stream I completely terminate the delivery of material to the container which is receiving the weighed charge.

A secondary feature of my invention consists in providing two containers, each with its deflector, and, as to both containers, filling them through the deflector from a stream directed toward the opposite container. Whereas I find it advantageous to provide two independent streams, it will be understood that this is rather a matter of detail than principle, as so long as some means are maintained for intermittently delivering a stream alternatively to the two containers, my system will operate. Also, whereas I find it advantageous to mount the deflectors on the receiving containers, and to employ the downward movement of each container to withdraw its deflector from the stream delivered toward the opposite container, it will be understood that I may provide independent deflector means and some other driving connection or actuating connection between a receiving container and a deflector or deflectors extending into a stream, which is not itself directed toward that receiving container.

Whereas I have illustrated a satisfactory wiring diagram and electric actuating means for the various steps, it will be understood that this is a matter of illustration rather than limitation, and that, for example, I may employ, any other suitable controlling mechanisms.

I claim:

1. In an automatic weigher, a pair of weight responsive supports, a material receiving receptacle for each said weight responsive support, means for delivering a stream of material alternately toward each receptacle, an individual deflector adjacent each receptacle, means for controllably positioning the deflector of one receptacle in the stream of material directed toward the opposite receptacle, and means for discharging the weighed material.

2. The structure of claim 1 characterized in that the positioning means are adapted to withdraw each deflector progressively from the stream of material directed toward the opposite receptacle, in response to the increasing weight in said receptacle, whereby an accurate dribble finish is provided.

3. The structure of claim 1 characterized in that each deflector includes an angular beak portion, whereby, as it is withdrawn, a progressively smaller area of the deflector is aligned with the stream from which it is withdrawn.

4. The structure of claim 1 characterized by and including means for preventing simultaneous delivery of material toward said deflectors.

5. The structure of claim 1 characterized in that the means for positioning the deflectors are adapted to interrupt the delivery of material toward one receptacle in response to a predetermined change in the weight of material within the opposite receptacle.

6. The structure of claim 1 characterized in that the deflector positioning means include means for initiating the delivery of material toward one receptacle in predetermined relation to the discharge of material from such receptacle.

7. In an automatic weigher, a pair of weight responsive supports, a material receiving receptacle for each said weight responsive support, means for delivering a stream of material to be weighed alternately toward each receptacle, an individual deflector adjacent each receptacle, means for controllably positioning each such deflector in the stream when directed toward the opposite receptacle, means for discharging the weighed charge from each receptacle, and means responsive to the discharge of the weighed charge from a receptacle for initiating the movement of the stream of material toward such receptacle, with the deflector of the opposite receptacle initially located in the line of flow of said stream.

8. In an automatic weigher, a pair of weight responsive supports, a material receiving receptacle for each said weight responsive support, means for delivering two independent streams of material, one toward each receptacle, control means for preventing the simultaneous flow of said two streams, a deflector for each receptacle and means for controllably positioning it in line with the stream directed toward the opposite receptacle, said means being effective progressively to withdraw said deflector from such stream in response to the increasing weight of the material in said receptacle, means for interrupting the flow of said stream in predetermined relation to the delivery of the charge to the material receiving receptacle, means for discharging said receptacle, and means for thereafter initiating the flow of a stream of material toward said receptacle, with the deflector of the other material receiving receptacle initially in the line of flow of said last mentioned stream.

9. In an automatic weigher, a pair of weight responsive supports, a material receiving receptacle for each said weight responsive support, an individual material delivery spout aligned with each said receptacle, a deflector for each said receptacle, the deflector of each receptacle being alignable with the line of delivery of the spout aligned with the opposite receptacle, and means for controllably positioning each said deflector in line with a stream directed toward the opposite receptacle, and for removing it in relation to such stream in response to the increase of the weight of the material of its receptacle.

10. The structure of claim 9 characterized in that the receptacles have adjacent edges, the deflectors being pivoted to said edges.

11. The structure of claim 9 characterized in that the receptacles are generally semi-cylindrical and have adjacent, generally parallel edges.

12. The structure of claim 9 characterized in that the receptacles have adjacent edges, the deflectors being pivoted to said edges, the receptacles being elongated in general parallelism, and the delivery spout aligned with each receptacle being adjacent one end of the receptacle and opposite to the deflector associated with the opposite receptacle.

13. The structure of claim 9 characterized in that the receptacles are generally semi-cylindrical and have adjacent, generally parallel edges, the receptacles being elongated in general parallelism, and the delivery spout aligned with each receptacle being adjacent one end of the receptacle and opposite to the deflector associated with the opposite receptacle.

14. In an automatic weigher, a pair of scale beams, each such beam having damping means adapted to prevent sudden or rapid movement of the beam, each beam having a receiving receptacle, the receptacles of the two beams being adjacent, adjacent delivery spouts, one for each receiving receptacle, each spout positioned and adapted to direct a stream of material toward one such receptacle, and a deflector for each receptacle, and means for initially positioning each said deflector with an edge portion entering the stream of material directed by one of the spouts toward the opposite receiving receptacle.

15. The structure of claim 14 characterized in that each deflector is pivoted to the receiving receptacle with which it is associated, each deflector having pivoted to it, at a point remote from its pivotal connection with its receptacle, a link extending to and pivoted at a fixed point, whereby, in response to raising or lowering of each receiving receptacle, its associated deflector is rotated about its pivotal connection with its receptacle toward and away from the delivery spout aligned with the opposite receiving receptacle.

16. In an automatic weigher, a plurality of material receiving receptacles, a bottom closure for each said receptacle, means for normally holding said closure in closed position, means for delivering a stream of material successively toward each receptacle, a deflector for each receptacle, means for initially positioning each deflector in the stream of material directed toward another receptacle and for progressively withdrawing it from said stream in response to the progressive increase of the weight of material in the receptacle with which it is associated, and means for terminating the flow of said stream after said last mentioned receptacle is charged.

17. The structure of claim 16 characterized by and including means for initiating the flow of each of said streams in response to the discharge of the charge within the receptacle toward which said stream is directed.

18. In an automatic weigher, a pair of weight responsive supports, a material receiving receptacle for each such weight responsive support, means for delivering a stream of material alternately toward the opening of each receptacle, an individual deflector for each receptacle, means for initially positioning each such deflector in the stream of material moving toward the opposite receptacle, said means being adapted in response to an increase in the weight of the charge within each receptacle progressively to withdraw the deflector of one receptacle from the stream of material being delivered toward the opposite receptacle.

19. In an automatic weigher, a pair of weight responsive supports, a separate material receiving receptacle supported upon each said weight-responsive support, spout means for delivering a stream of material alternately, and generally downwardly, toward the opening of each receptacle, an individual deflector for each receptacle, means for initially positioning each such deflector in the stream of material moving toward the opposite receptacle, said means being adapted, in response to an increase in the weight of the charge within each receptacle, progressively to withdraw the deflector of one receptacle from the stream of material being delivered toward the opposite receptacle, each such deflector having an edge portion having a generally sharp point, the point being the part of the deflector which is the last to be withdrawn from the stream.

LEON J. NOWAK, Jr.

References Cited in the file of this patent

UNITED STATES PATENTS

| Number | Name | Date |
|---|---|---|
| 287,033 | Lewis | Oct. 23, 1883 |
| 488,101 | Washington | Dec. 13, 1892 |
| 492,485 | Ostenberg | Feb. 28, 1893 |
| 600,030 | Richards | Mar. 1, 1898 |
| 832,102 | Turner | Oct. 2, 1906 |
| 934,420 | Weyant | Sept. 14, 1909 |
| 1,527,633 | Debay | Feb. 24, 1925 |
| 2,260,718 | Merrifield | Oct. 28, 1941 |
| 2,386,308 | Gorton | Oct. 9, 1945 |
| 2,624,538 | Schrock | Jan. 6, 1953 |